United States Patent [19]

Hollister

[11] Patent Number: 5,051,750

[45] Date of Patent: Sep. 24, 1991

[54] WINDS ALOFT ESTIMATION THROUGH RADAR OBSERVATION OF AIRCRAFT

[75] Inventor: Walter M. Hollister, Lincoln, Mass.

[73] Assignee: Massachusetts Institute of Technology, Cambridge, Mass.

[21] Appl. No.: 592,110

[22] Filed: Oct. 3, 1990

Related U.S. Application Data

[63] Continuation-in-part of Ser. No. 360,245, Jun. 2, 1989, abandoned.

[51] Int. Cl.[5] .............................................. G01S 13/95
[52] U.S. Cl. .................................... 342/26; 342/115; 342/104
[58] Field of Search ................... 342/26, 59, 104, 105, 342/106, 107, 115, 195, 460

[56] References Cited

U.S. PATENT DOCUMENTS

| Re. 33,152 | 1/1990 | Atlas | 342/26 |
|---|---|---|---|
| 3,588,897 | 6/1971 | Konrad | 343/6 |
| 4,043,194 | 8/1977 | Tanner . | |
| 4,103,300 | 7/1978 | Gendreau et al. | 343/6 |
| 4,172,255 | 10/1979 | Barrick et al. | 343/5 |
| 4,219,887 | 8/1980 | MacCready, Jr. | 367/90 |
| 4,286,462 | 9/1981 | Bourne | 73/189 |
| 4,573,352 | 3/1986 | Hurtig et al. | 73/189 |
| 4,589,070 | 5/1986 | Kyrazis | 364/424 |
| 4,649,388 | 3/1987 | Atlas | 342/104 |
| 4,698,636 | 10/1987 | Marlow et al. | 342/104 |
| 4,712,108 | 12/1987 | Schwab | 342/26 |
| 4,740,899 | 4/1988 | McElreath | 364/434 |
| 4,761,650 | 8/1988 | Masuda et al. | 342/26 |

FOREIGN PATENT DOCUMENTS 2455341 10/1979 Fed. Rep. of Germany .
2622297 10/1987 France .

OTHER PUBLICATIONS

Using Aircraft Radar Tracks to Estimate Winds Aloft, Hollister et al.

*Primary Examiner*—John B. Sotomayor
*Attorney, Agent, or Firm*—Bromberg & Sunstein

[57] ABSTRACT

A method and a system for determining the wind velocity vector in a region in which a turn is being executed by an aircraft using a positional detection system to obtain aircraft positional data during the turn, calculating the ground speed vector of the aircraft at a plurality of points during the turn and determining the wind vector that best fits the ground speed vector data. The wind velocity vector can be calculated even when the aircraft airspeed vector is not constant.

14 Claims, 5 Drawing Sheets

WINDS ALOFT ESTIMATION THROUGH RADAR OBSERVATION OF AIRCRAFT

STATEMENT OF UNITED STATES GOVERNMENT INTEREST

The invention described herein was made in the performance of work under contract number DTF A01-87-Z-02024 with the Federal Aviation Administration, and is subject to rights of the United States government in accordance with applicable law.

This application is a continuation-in-part of application Ser. No. 360,295, filed June 2, 1989, now abandoned incorporated herein by reference.

DESCRIPTION

1. Technical Field

The present invention relates to wind measurement, and particularly to measurement of winds aloft in regions, such as near air terminals, where aircraft are maneuvering.

2. Background Art

One goal of air traffic control automation is the capability to land an aircraft at a runway within five to ten seconds of the planned arrival time. Such precision is difficult to attain because of the uncertainty of estimating winds aloft, which can significantly affect the amount of time an aircraft will take to reach its destination. For an airspeed of 300 knots (kn), a 15-kn error in estimating the wind will cause an error in flying time of three seconds for each minute of flight. Flying-time errors, in turn, affect estimates of aircraft fuel consumption, runway capacity and the physical separations between aircraft. Substantial uncertainties in wind estimates require frequent control actions by air traffic controllers to achieve acceptable runway precision.

The winds-aloft information currently available for air traffic control is based on radio-balloon soundings taken at various locations worldwide, including 80 sites in the continental United States. The soundings are taken twice a day, at noon and midnight Greenwich mean time, and then input to a meteorological model to obtain an aviation forecast. The time interval from the beginning of the observations to the dissemination of the aviation forecast typically ranges from seven to nine hours. When the forecast is first available, the uncertainty of the winds aloft is on the order of ±15 kn. During the 12-hour interval before the next forecast is available, the uncertainty increases to between 25 kn and 30 kn.

Winds aloft can also be estimated by subtracting the airspeed vector of an aircraft, as determined by onboard measurements of airspeed and heading, from the ground speed vector, as determined by the radar beacon track. This method, however, requires a means for relaying an aircraft's onboard measurements to the ground-based computer.

SUMMARY OF THE INVENTION

The invention utilizes the discovery that with a radar track of an aircraft that is turning at a constant airspeed, the winds aloft can be deduced without any information regarding the vehicle's heading or airspeed. A preferred embodiment of the invention uses a positional detection system to obtain ground speed vectors at a plurality of points around the turn, fits a circle to the ground speed vectors and determines the vector to the center of the circle to obtain wind velocity. Another preferred embodiment of the invention utilizes the fact that there are typically large numbers of aircraft making turns at different altitudes and locations within the terminal airspace, data from which provide a means of determining the wind field as a function of location, altitude, and time. With a large number of measurements available, the errors due to airspeed acceleration or radar noise can be reduced by statistical smoothing of the data.

BRIEF DESCRIPTION OF THE DRAWINGS

FIGS. 1a and 1b illustrate the velocity-vector geometry on which calculations are made for a single aircraft turn in accordance with the invention.

DESCRIPTION OF SPECIFIC EMBODIMENTS

Theory of Wind Measurement

Figure 1A:
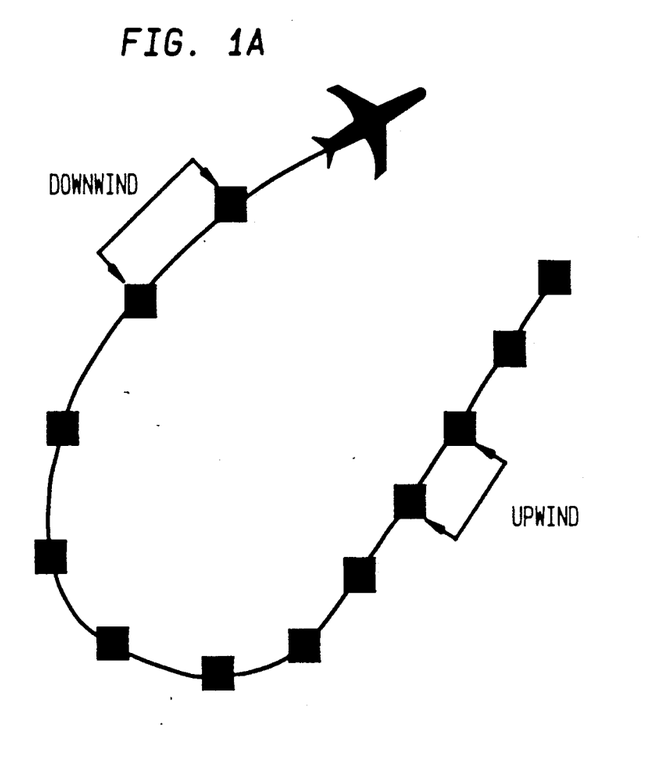
FIG. 1a shows radar observations.
Figure 1B:
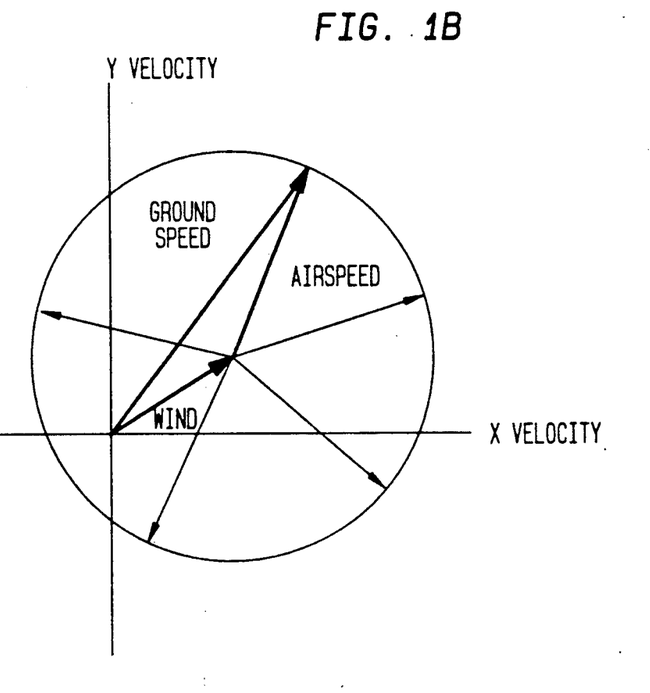
FIG. 1b shows a velocity plot.

To extract a wind measurement from a radar track of a turning aircraft, the vehicle's velocity in the y-direction is plotted against its x-direction velocity. If there is no wind, the aircraft will maintain a constant speed with respect to both the air and ground. The plotted points will fall in a circle centered on the origin, since the distance from the origin to the points in velocity space is by definition the aircraft's ground speed. If there is a wind, the aircraft will still maintain a constant speed with respect to the air, but the ground speed will change with respect to the aircraft's heading. The vehicle will have a minimum ground speed when it heads into the wind and a maximum when it heads downwind (FIG. 1a). In the latter case, the locus of the ground speed vectors will still circumscribe a circle, but the center of the circle will be the origin in a frame of reference that moves with the air. In other words, the circle will be offset from the origin by the wind velocity (FIG. 1b).

Figure 2:
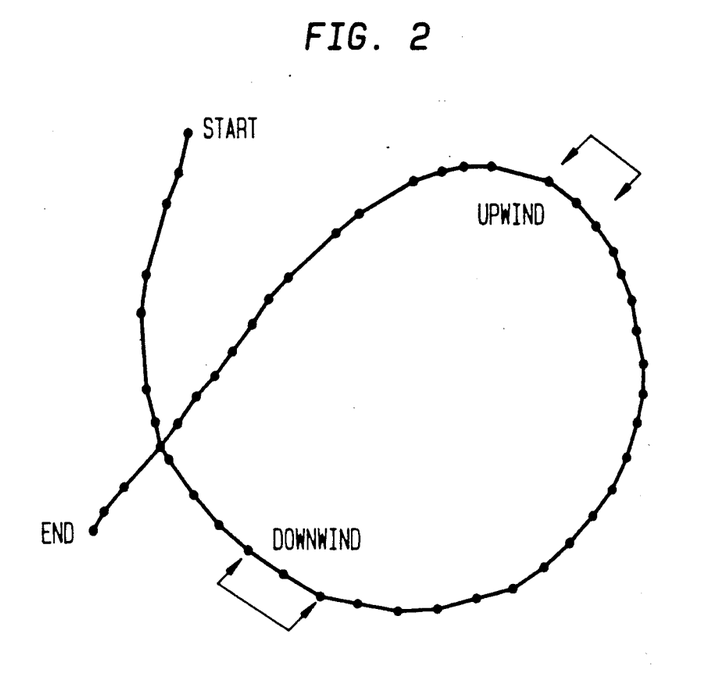
FIG. 2 shows the measured ground track of an aircraft that is making a turn.
Figure 3:
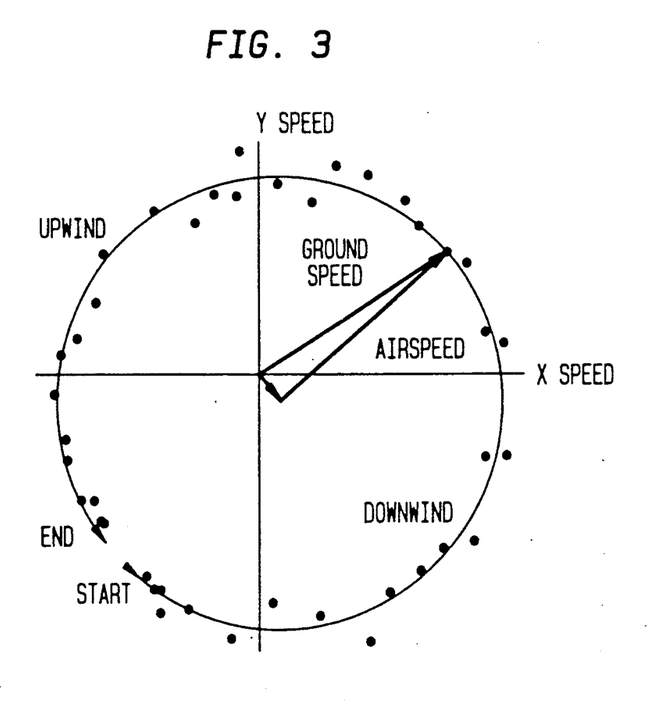
FIG. 3 shows the velocity track for the turn of FIG. 2.

Thus, a wind estimate can be obtained from an aircraft turn first by fitting a circle to the velocity estimates taken during the turn and then by determining the velocity coordinates of the center of the circle. FIG. 2 shows the measured ground track of an aircraft that is making a turn. FIG. 3 shows the velocity track for that same turn. In FIG. 3, the best-fit circle is superimposed on the velocity track.

Several techniques are available for fitting a circle to the data points. In this article, an iterative approach is used in which a search is conducted for the wind vector and aircraft airspeed that give the minimum unbiased estimate of the variance in the magnitude of the ground speed. The approach consists of the following steps: initial values for the wind and aircraft airspeed are assumed; the ground speeds that follow from that choice of wind and airspeed are calculated; those values are in turn used to compute the unbiased variance and its first two derivatives (see "Derivations of Wind-Estimate Quantities" hereinbelow); and, by assuming that the unbiased variance is roughly quadratic, the next guess for the wind and airspeed is calculated. The process is repeated until the variance values are below a certain threshold.

In the above approach, the estimate of the variance of the ground speed is unbiased because each data point is weighted by the reciprocal of its measurement variance. It was necessary to account for the individual variance of each point because of the large difference between errors in the range and bearing directions at long ranges. The section "Sources of Error" hereinbelow discusses this discrepancy.

Advantages of the Present Invention

One advantage of the present invention is that it requires no additional sensors beyond what are already routinely used at airports. The invention can thus function as an inexpensive backup to future wind sensors. Another advantage is the capability to estimate the winds aloft over a wide geographic area. Within the airport terminal's airspace, many aircraft are typically making turns at different altitudes and locations. The turning aircraft provide a large quantity of data that can be used to estimate the wind field as a function of location, altitude and time.

Additional sources of accurate wind information may be employed in the long-term future. Winds-aloft estimates by aircraft equipped with inertial navigation systems may be downlinked via Mode-S or satellite data links. Furthermore, new Doppler weather radars, such as the Next-Generation Weather Radar (NEXRAD) and vertical wind profilers, have the potential to provide much more accurate and frequent wind measurements than are currently available from the radio-balloon soundings. The present invention allows for the incorporation of wind measurements from multiple sources.

Sources of Error

The radar-track measurements used to estimate the winds aloft contain two major sources of error. The first is due to changing airspeed during a turn. The second, which leads to noisy ground-speed measurements, results from random errors in radar position. Because of the large number of wind measurements expected, both types of errors will be reduced through statistical filtering. The symbols used are as follows:

Symbols $E[\chi]$ expected value of $\chi$
H information matrix (inverse of wind-error covariance matrix
h partial derivative of ground speed with respect to z
J a function to be minimized
m total number of measurements
n ground speed measurement error
r range from radar sensor
T true airspeed
$\Delta t$ scan period
V ground speed
w wind speed
w wind vector
x east component of radar position
y north component of radar position
z wind and true-airspeed-measurement vector
$\epsilon$ wind-estimation-error vector
$\phi$ track angle of ground speed vector relative to north
$\sigma$ standard deviation
$\theta$ bearing from radar relative to north

Subscripts $\chi_k$ value associated with the kth measurement of $\chi$
$\chi_m$ measurement corrected to grid-point of $\chi$
$\chi_n$ new grid-point estimate of $\chi$
$\chi_o$ old grid-point estimate of $\chi$
$\chi_x$ east coordinate of $\chi$
$\chi_y$ north coordinate of $\chi$

Superscripts $\chi^T$ transpose of vector or matrix $\chi$
$\chi^{-1}$ inverse of matrix $\chi$
$\hat{\chi}$ estimated quantity
$\tilde{\chi}$ measured quantity

Sources of Error: Acceleration Errors

The error due to changing airspeed during a turn would be undetectable if the aircraft were to accelerate with respect to the air in exactly the same sinusoidal way in which the wind causes the vehicle's ground speed to change during a turn. That condition, however, is unlikely because airspeed typically changes monotonically rather than sinusoidally with respect either to time or to the angle of turn.

The wind error caused by a changing airspeed can be derived with four simplifying assumptions.

(1) The actual wind speed is zero.
(2) The observed ground speed increases linearly with respect to the turn angle.
(3) If there were a wind, it would cause the ground speed to vary sinusoidally with respect to the turn angle. (This assumption is true when the wind speed is much smaller than the airspeed.)
(4) The magnitude of the estimated wind is that which minimizes the integral of the square of the difference between the observed and predicted ground speeds.

The above assumptions are not part of the basic theory of wind estimation; rather, they are used for the sole purpose of obtaining an approximate model for the error that a changing airspeed causes. The four assumptions enable the determination of the value of the erroneous wind w (see "Symbols" above) that minimizes J, which is defined as the square of the difference between the observed ground speed and the ground speed predicted by the erroneous wind:

$$J = \int_0^{\Delta \frac{\phi}{2}} \left( \frac{\Delta V}{\Delta \phi} \phi - w \sin\phi \right)^2 d\phi$$

where $\Delta \phi$ = turn angle in radians, $\frac{\Delta V}{\Delta \phi}$ = velocity change per radian of turn, and $w$ = wind error due to acceleration Expanding and evaluating the integral results in $$J = \left[\left(\frac{\Delta V}{\Delta \phi}\right)^2 \frac{\phi^3}{3} - 2w \frac{\Delta V}{\Delta \phi}(\sin\phi - \phi\cos\phi) + w^2\left(\frac{\phi}{2} - \frac{\sin 2\phi}{4}\right)\right]_0^{\frac{\Delta \phi}{2}}$$

To obtain the minimum value of J, set $$\frac{dJ}{dw} = 0$$

and solve for w:

$$w = \frac{4 \frac{\Delta V}{\Delta \phi}\left(\sin \frac{\Delta \phi}{2} - \frac{\Delta \phi}{2} \cos \frac{\Delta \phi}{2}\right)}{\Delta \phi - \sin \phi}$$

Figure 4:
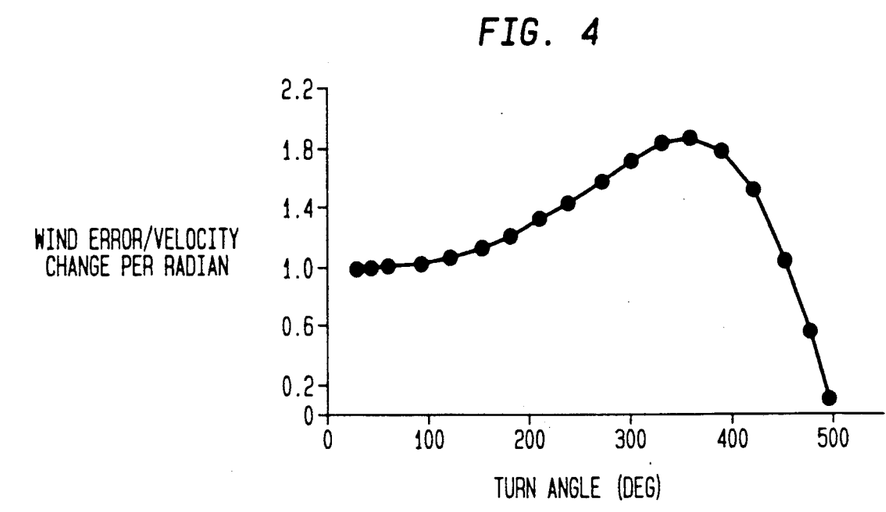
FIG. 4 is a graph of wind estimation error due to acceleration as a function of turn angle for constant acceleration throughout the turn.

The result is plotted in FIG. 4. When an aircraft changes its airspeed during a turn, the typical value of $\Delta V/\Delta \phi$ is 20 kn. At that rate, the maximum wind error from FIG. 4 is 40 kn if the vehicle's acceleration is sustained throughout a full 360° of turn. (The 360° turn corresponds to a total velocity of 125 kn, i.e., $2\pi \times 20$ kn.) In practice, however, there are few turns that extend beyond 180°. (Again, with the assumption that $\Delta V/\Delta \phi$ is 20 kn, a turn of 180° would correspond to a total velocity change of 75 kn and, from FIG. 4, a wind error of about 25 kn.) Furthermore, aircraft do not typically change their airspeed by as much as 75 kn at one time; i.e., they do not continue to accelerate throughout a long turn.

Figure 5:
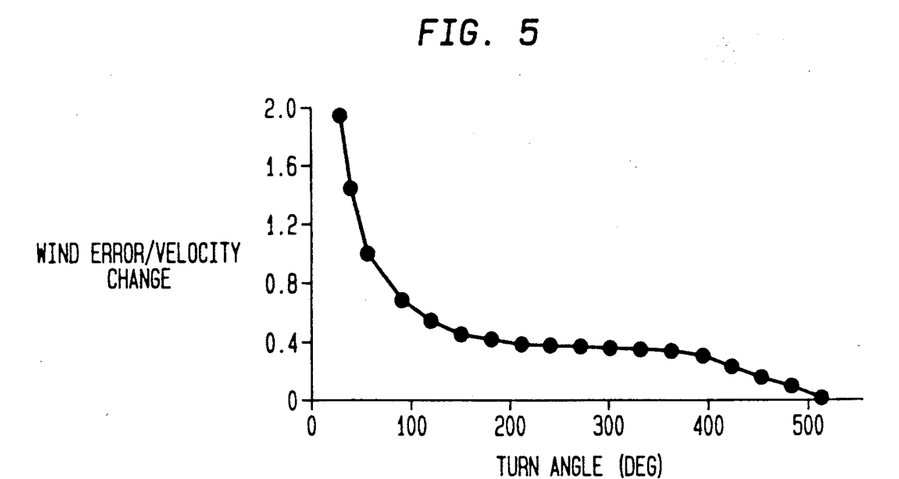
FIG. 5 is a graph of wind estimation error as a fraction of the total velocity change in relation to turn angle under conditions the same as for FIG. 4.

An interrupted acceleration can be approximated by assuming a constant acceleration of a smaller magnitude. Thus, by using the same assumptions that were made to generate FIG. 4, the wind error as a fraction of the total velocity change can be plotted (FIG. 5). The figure shows that for typical turns of interest, the sensitivity of the wind error to velocity change varies from about 0.6 to 0.4.

If there were no radar errors, it should be possible to detect monotonic acceleration in the larger turns. The authors have experimented with several techniques for doing so; most of the techniques have failed to converge accurately when the data contained radar noise.

Sources of Error: Radar Errors

Radar errors in pinpointing an aircraft's position propagate errors in determining the velocity of the vehicle. These measured velocity errors propagate further errors in estimating the wind. "Derivations of Wind Speed Estimates" hereinbelow contains a derivation of the wind-error covariance matrix in terms of the aircraft's heading and the measurement-error variance in each individual velocity measurement. Background for this type of analysis is contained in A. E. Bryson and Y. C. Ho. *Optimal Control* (Hemisphere Publishing Corp., Washington, 1975). It will be shown below how each variance in measurement error can be determined from the range-error and bearing-error variances and the direction of the velocity vector relative to the radius from the radar sensor.

For the special case in which all of the measurement-error variances are equal, the wind-error covariance becomes a relatively simple function of the aircraft heading at the time of each measurement.

Figure 6:
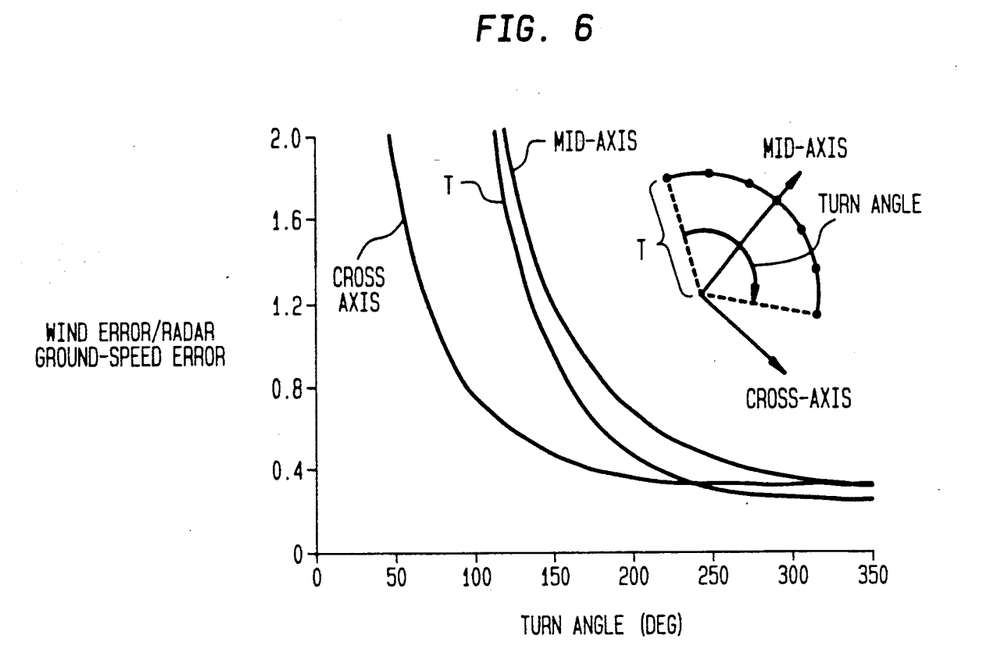
FIG. 6 is a graph of wind-estimation error per radar ground speed error vs. turn angle. The wind error is broken down into three components: cross-axis, mid-axis, and the true airspeed.
Figure 7:
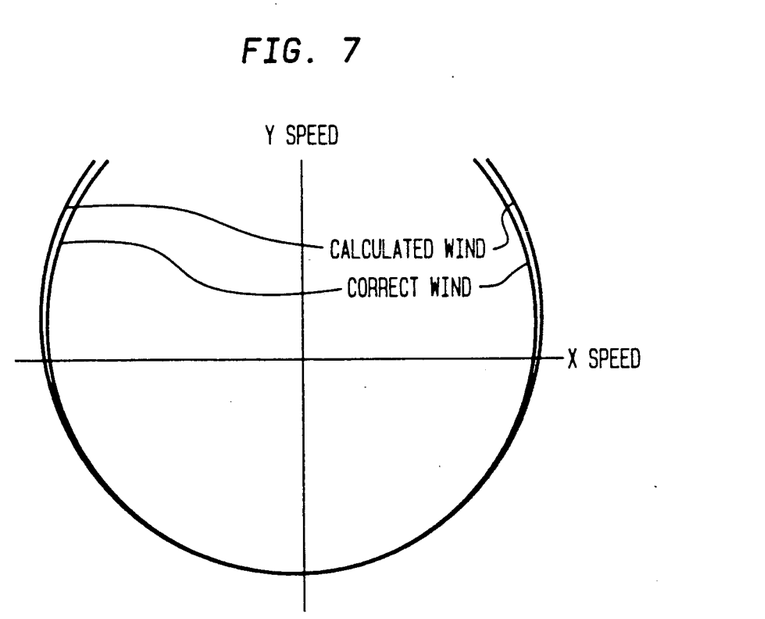
FIG. 7 shows a small turn segment from a simulated flight with no radar noise beyond round-off error and shows that the mid-axis error is larger than the cross section error.

FIG. 6 plots the wind error (as derived in "Derivations of Wind Speed Estimates" hereinbelow) divided by the radar ground speed error as a function of the turn angle. From the figure, several observations can be made. Up until the turn approaches 360°, the cross-axis $\sigma$ is considerably smaller than the mid-axis $\sigma$. In other words, for a wind estimate based on a short turn the component measured in the cross-axis direction may be valuable, while the component measured in the mid-axis direction may also be so inaccurate as to be useless. For this reason, it is extremely important that the wind error information matrix H, which is defined in "Derivations of Wind Speed Estimates" hereinbelow, be propagated for each measurement and used to weight each component when the measurements are combined. FIG. 7, which shows a small-turn segment from a simulated flight with no radar noise beyond roundoff error, contains the correct and fitted velocity circles. Note that there is a significant wind error in the figure. The error, however, is only in the mid-axis direction.

Sources of Error: Effects of Different Range and Bearing Accuracy

In the derivation of FIG. 6, the radar-error variance was assumed to be constant. But FIG. 3 demonstrates that errors can occur predominantly in one direction. For the case in which the radar-error variance is not constant, it is necessary to evaluate the variance as a function of the range and bearing errors and the orientation of the ground-speed vector relative to the radius vector from the radar.

A sensor will estimate the range and bearing of a target with some constant precision. However, a constant error in bearing will result in a position error proportional to the range. Thus, defining $r_s$ as the range at which the position-error variances are the same in each direction gives $\sigma_\theta = (r/r_s)\sigma_r$. The velocity variances in the range and bearing directions are respectively given by $$\frac{2\sigma_r^2}{\Delta t^2} \text{ and } \left(\frac{r}{r_s}\right)^2 \frac{2\sigma_r^2}{\Delta t^2}$$

(The factor of 2 results from taking the difference of two positions.) The velocity variance in other directions is given by an ellipse with the range and bearing variances as the ellipse's semimajor and semiminor axes.

Figure 8:
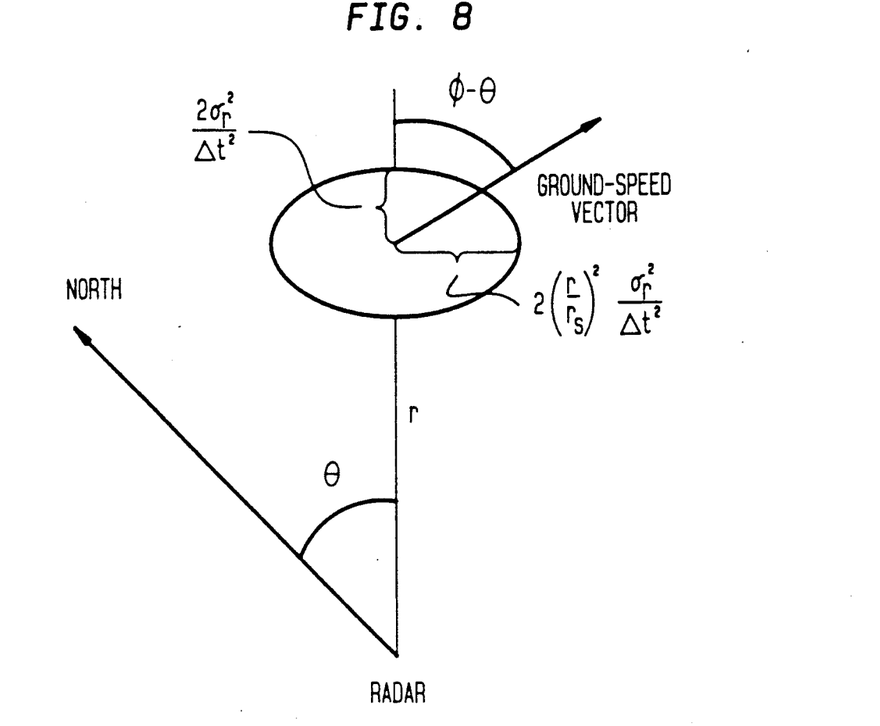
FIG. 8 shows orientation of ground speed vector to velocity-error ellipse.

The variance in the direction of the ground speed vector can be deduced with the aid of FIG. 8 in which $\phi - \theta$ is the angle between the ground speed and the radius vectors. Thus, $$\sigma_k^2 = 2 \frac{\sigma_r^2}{\Delta t^2}\left[\cos^2(\phi_k - \theta_k) + \left(\frac{r_k}{r_s}\right)^2 \sin^2(\phi_k - \theta_k)\right]$$

which is the polar-coordinate equation of the ellipse in FIG. 8.

Typical values for the Mode S Experimental Facility (MODSEF) radar at the Laboratory are $\sigma_r = 30$ ft.; $r_s = 8$ nautical miles (nmi); $\Delta t = 5$s. With MODSEF, the one-o uncertainty in the range direction of a velocity measurement is given by $$\sqrt{2}\left(\frac{30 \text{ ft}}{5 \text{ s}}\right)\left(\frac{3,600 \text{ s/hr}}{6,076 \text{ ft/nmi}}\right) = 5.0 \text{ kn.}$$

At a range of 8 nmi, the one-o uncertainty in the bearing direction is also 5 kn. For an aircraft making a 180° turn at this range, the wind-error ellipse due to radar error would have a semi-major axis with $\sigma$ just under 4 kn and a semi-minor axis with $\sigma$ just under 2 kn. (At a range of 8 nmi, $\sigma$ is isotropic. Thus error factors for 180° from FIG. 6 can be used if they are multiplied by 5 kn.)

At a 40-nmi range, the accuracy in the bearing direction is five (i.e., 40/8) times worse than the accuracy in the range direction Taking this fact into account for turns at that range leads to a better wind estimate because the range component of each velocity measurement is more heavily weighted than the bearing component. In addition, since the final wind estimate from 40-nmi data can be five times worse in one direction than an estimate from 8-nmi data, the estimate must be weighted proportionately less when it is combined into the wind field.

Computational Procedure

Ground speed vectors for every scan of each aircraft track can be obtained by taking the difference between the sequential radar positions of aircraft and then dividing by the scan interval. A test based on the angle changes between adjacent ground speed vectors is then performed to detect the beginnings and ends of the turns. When a turn of sufficient magnitude is detected (i.e., a turn with any angle greater than one radian), a search is conducted for the wind and airspeed estimates that minimize the weighted variance of the measured ground speed from the predicted ground speed. After the search is completed, the information matrix of the estimate is evaluated with the formula for H that is derived in the appendix; the covariance matrix is $H^{-1}$. The results provide a single wind measurement defined by the following:

(1) x-coordinate of measurement location (nmi),
(2) y-coordinate of measurement location (nmi),
(3) altitude of measurement (ft. $\times 100$)
(4) time of measurement(s),
(5) x-component of wind velocity (kn),
(6) y-component of wind velocity (kn), and
(7) covariance matrix ($kn^2$).

Whenever a new wind measurement is calculated, it is incorporated into a wind field containing the total of all previous weighted measurements. Wind measurements may also come from outside sources such as airborne inertial navigation systems, wind profilers, Dopler radars, or satellite sensors.

Wind-Field Representation

Grid points are used to define a wind field. A grid point is defined in the same manner as a wind measurement except that the indicated time represents the time of the last update rather than the time of the measurement. Grid points are separated by 20 nmi in the x- and y- directions, and by 1,000 ft. in altitude.

To keep a wind field up to date, every grid point is revised whenever a new wind measurement becomes available. When a wind measurement is used to update a grid point, the covariance matrix of the measurement must be increased in accordance with the difference in altitude and position between the location of the measurement and the grid point in question. Based on preliminary empirical estimates, the covariances are isotropically increased in the following way: 2 $kn^2$ per 1-nmi position difference and 100 $kn^2$ per 1,000-ft. altitude difference. The grid-point wind estimate is updated through the use of information matrices:

$$H_n = H_o + H_m$$

$$H_n W_n = H_O W_O + H_m W_m$$

where $H_m$ = information matrix of measurement at grid point
$H_O$ = old measurement matrix of grid point
$H_n$ = new measurement matrix of grid point
$W_m$ = wind measurement to be incorporated
$W_O$ = old grid-point wind estimate
$W_n$ = new grid-point wind estimate Between measurement updates, the grid-point covariances are increased linearly with time at an empirically estimated rate of 100 kn: per hour.

After more data has been accumulated, the above empirical values may be adjusted.

Experimental Results

Most of the experimental results with real-life data described herein are based on Lincoln Laboratory MODSEF radar tracks of commercial air traffic flying near Logan International Airport in Boston.

One data set consists of 70 minutes of peak traffic that flew under Instrument Flight Rules (IFR) procedures on 15 Dec. 1987—a day of low cloud cover, single-runway operation and backed-up traffic (several stacks of aircraft were flying in holding patterns). Another data set consists of four hours of Visual Flight Rules (VFR) traffic on 13 May 1988—a day of good weather, multiple-runway operation and no backed-up traffic. For the data collected on the IFR day, there were 126 usable turns (1.8 usable turns per minute) with an average turn angle of 130°. (A turn is considered usable for wind estimation if it is continued through at least 1 radian and the aircraft does not descend by more than 3,000 ft. or climb by more than 5,000 ft. during the turn.) For the data collected on the VFR day, there were 302 usable turns (approximately 1.2 usable turns per minute) with an average turn angle of 122°.

The most obvious observation from the two data sets is that on the day on which aircraft flew in holding patterns, there were more turns that were useful for wind estimation. This is a favorable result in that holding delays increase as airport throughput approaches capacity—the very condition for which accurate wind information is most valuable.

On VFR days in August, 1988 and February, 1989, an additional 15.5 hours of recorded data produced similar results. During the 15.5 hours, there were an average of 1.0 usable turns per minute and the turns had an average turn angle of 126°.

Individual wind estimates on such real-life data were repeatable to a precision of approximately $\sigma = 15$ kn.

When the estimates were combined, they described a wind field to a precision between 5 kn (at low altitudes near the airport) and 10 kn (at higher altitudes and at distances farther from the airport). The calculated wind estimates were consistent with the soundings taken at Chatham, Mass., given the precision of those soundings. In addition, when the wind-estimation algorithm was applied to the output of two different aircraft simulators, the algorithm correctly reproduced the wind field that was used in the simulations.

Derivations of Wind-Estimate Quantities

This section contains derivations for the ground speed estimate and its derivatives; the cost function J and its derivatives; the wind-error covariance matrix that minimizes J; and the expected value of the minimized J.

Derivation of Ground Speed Estimate and Its Derivatives

Figure 9:
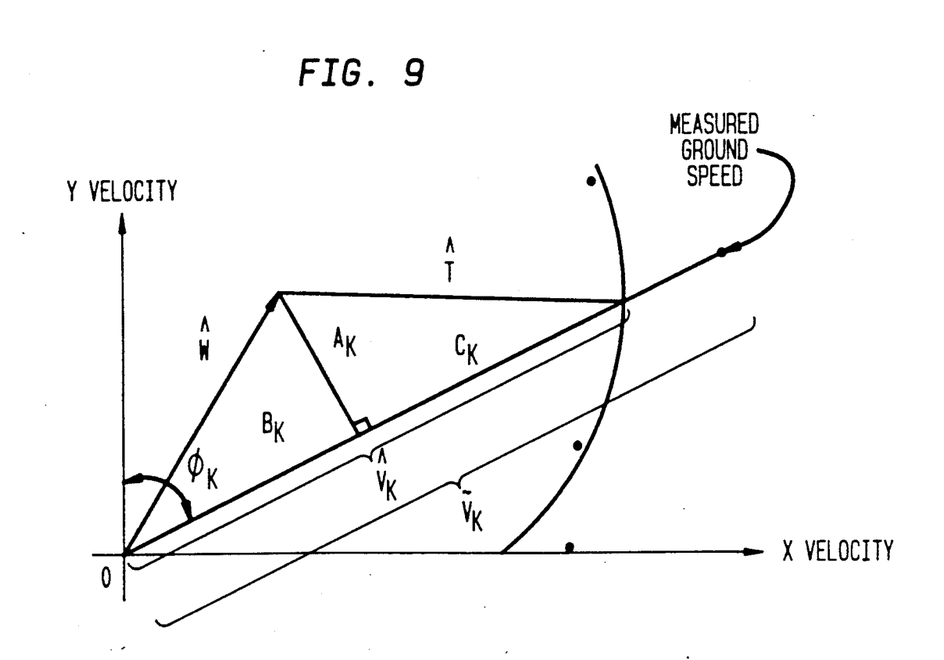
FIG. 9 shows coordinates for ground speed estimation.

By using the geometry FIG. 9, a value for $V_k$ (the kth estimate of ground speed) can be derived from the quantities $W_x$, $W_y$ (the estimated wind), T (the estimated airspeed) and $\phi_k$ (the angle from the north of the measured ground speed). Since $a_k$ and $b_k$ are respectively equal to the y and x components of the wind rotated by $90° - \phi_k$, $$a_k = W_x \cos\phi_k - W_y \sin\phi_k$$

$$b_k = W_x \sin\phi_k + W_y \cos\phi_k.$$

And from the geometry of FIG. 9, $$c_k = \sqrt{T^2 - a_k^2}$$

and $$V_k = c_k + b_k$$
$$= \sqrt{T^2 - (w_x \cos\phi_k - w_y \sin\phi_k)^2} + w_x \sin\phi_k + w_y \cos\phi_k$$

Let z be an estimation vector that contains wind and airspeed estimates, i.e., $z \equiv [X_x, W_y, T]^T$. The derivatives of $V_k$ with respect to z can be calculated by using straightforward calculus:

$$\frac{\delta V_k}{\delta z} = h_k^T = \frac{[V_k \sin\phi_k - w_k, V_k \cos\phi_k - w_y, T]^T}{c_k} \quad [1]$$

$$\frac{\delta V_k}{\delta z^2} = -\frac{\alpha \alpha^T}{c_k^3},$$

where $\alpha \equiv [T \cos\phi_k, -T \sin\phi_k, -a_k]^T$.

The Cost Function J and Its Derivatives

J, the cost function to be minimized, is defined as one-half the weighted square sum of the derivations of the ground speed measurements from their estimated values. Each weight is the reciprocal of the variance of that ground-speed measurement, or $1/\sigma^2_k$. Thus, $$J = \frac{\frac{1}{2} \sum_{k=1}^{m} (V_k - V)^2}{\sigma_k^2} \quad [2]$$

where $V_k$ is the measured ground speed and $V_k$ is the estimated ground speed for a given point.

The first two derivatives of J with respect to z are given by $$\frac{\delta J}{\delta z^2} = \sum_{k=1}^{m} \left(\frac{V_k - V_k}{\delta_k^2}\right)\left(\frac{\delta V_k}{\delta z}\right) \quad [3]$$

$$= \sum_{k=1}^{m} \left(\frac{V_k - V_k}{\delta_k^2}\right) h_k^T$$

$$\frac{\delta^2 J}{\delta z^2} = \sum_{k=1}^{m} \left(\frac{h_k h_k^T + (V_k - V_k)\left(\frac{\delta^2 V_k}{\delta z^2}\right)}{\sigma_k^2}\right)$$

Derivation of Wind-Error Covariance Matrix

For J to be a minimum, the first derivative of J with respect to z must be set equal to $O^T$, where O is a zero vector. Assume that $$V_k = V + \frac{\delta V_k}{\delta z}\epsilon \text{ and } V_k = V + n_k,$$

where $\epsilon$ = error in the wind estimate and
$n_k$ = error due to radar error;

$$E[n_k] = 0; \text{ and } E[n^2_k] = \sigma^2_k.$$

Substitute the assumed form of $V_k$ and $F_k$ into Equation 3:

$$\sum_{k=1}^{m} \frac{(h_k^T \epsilon - n_k) h_k^T}{\sigma_k^2} = O^T. \quad [4]$$

The wind-error vector $\epsilon$ does not vary over the summation and may be factored out of the expression. (Note the $h^t_K 68 = \epsilon^T h_k$ since the inner product of Equation 4 is communicative.) Equation 4 can thus be written as $$\epsilon^T \left[\sum_{k=1}^{m} \frac{h_k h_k^T}{\sigma_k^2}\right] = \sum_{k=1}^{m} \frac{n_k h_k^T}{\sigma_k^2}.$$

Let $$H = \sum_{k=1}^{m} \frac{h_k h_k^T}{\sigma_k^2} \quad [5]$$

H is a symmetric matrix that, as will be shown, defines the wind-information content inherent in the m measurements. When $H^{-1}$ exists, $\epsilon^T$ and $\epsilon$ can be written in terms of the errors in the ground speed measurements $n_k$:

$$\epsilon^T = \left[\sum_{k=1}^{m} \frac{n_k h_k^T}{\sigma_k^2}\right] H^{-1} \text{ and } \epsilon = H^{-1}\left[\sum_{k=1}^{m} \frac{n_k h_k}{\sigma_k^2}\right].$$

The wind-error covariance matrix is formed by taking the expected value of the product of $\epsilon$ and $\epsilon^T$. The product of the two summations can be rewritten as a double summation over two indices i and j:

$$E[\epsilon\epsilon^T] = H^{-1}\left[\sum_{i,j=1}^{m} \frac{E[n_i n_j] h_i H_j^T}{\sigma_i^2 \sigma_j^2}\right] H^{-1}.$$

Since $E(n_i n_j) = \sigma_i^2$ for $j = i$, and 0 for $j \neq i$, the double sum reduced to a single sum:

$$\begin{aligned} E[\epsilon\epsilon^T] &= H^{-1}\left[\sum_{i=1}^{m} \frac{h_i h_i^T}{\sigma_i^2}\right] H^{-1} \\ &= H^{-1} H H^{-1} \\ &= H^{-1} \end{aligned}$$

Thus the wind-error covariance matrix is $H^{-1}$, where H is given by Equation 5 and h is given by Equation 1.

Derivation of the Expected Value of J

To compute the value of J, insert the expanded form of $V_k - \bar{V}_k$ into the definition of J, which was given by Equation 2. Thus, $$E[J] = \frac{1}{2} E\left[\sum_{k=1}^{m} \frac{(h_k^T \epsilon - n_k)^2}{\sigma_k^2}\right].$$

the products of $\epsilon$ and $n_k$ will vanish since the two quantities are not correlated. Carrying out the square operation with the remaining quantities results in $$E[J] = \frac{1}{2} E\left[\sum_{k=1}^{m} \frac{\epsilon^T h_k h_k^T \epsilon}{\sigma_k^2} + \sum_{k=1}^{m} \frac{n_k^2}{\sigma_k^2}\right].$$

The first term contains the wind-error vector $\epsilon$, which can be factored out of the summation, leaving $$\begin{aligned} E\left[\epsilon^T \left(\sum_{k=1}^{m} \frac{h_k h_k^T}{\sigma_k^2}\right) \epsilon\right] &= E[\epsilon^T H \epsilon] \\ &= E[\epsilon^T (E(\epsilon\epsilon^T))^{-1} \epsilon] \\ &= 3. \end{aligned}$$

The second term reduces to $$\sum_{k=1}^{m} \frac{E[n_k^2]}{\sigma_k^2} = \sum_{k=1}^{m} \frac{\sigma_k^2}{\sigma_k^2} = m.$$

Therefore, $E[J] = (m+3)/2$.

To obtain the covariance matrix used in the calculations, the covariance estimate that was derived in the previous section and $J/E[J]$ are multiplied. This step partially compensates for any error in the model for $\sigma_k$.

What is claimed is:

1. A method for determining wind velocity in a region in which a turn is being executed by an aircraft, the method comprising:
    (a) using a positional detection system to obtain positional data pertaining to the aircraft during execution of the turn;
    (b) calculating the ground speed vector of the aircraft at a plurality of data points around the turn; and
    (c) determining the wind vector that best fits the ground speed vector data.

2. A method according to claim 1, wherein step (c) includes the steps of fitting a circle to the ground speed vectors taken during the turn and determining the velocity vector to the center of the circle.

3. A method according to claim 1, wherein step (c) includes the steps of associating a variance with each data point and searching for the wind vector that minimizes the weighted variance of the true airspeed of the aircraft.

4. A method for determining wind velocity in a region in which a plurality of turns are being executed by aircraft, the method comprising:
    (a) using a positional detection system to obtain positional data pertaining to aircraft that may be making turns;
    (b) identifying data pertaining to a turn of sufficient magnitude for calculation purposes;
    (c) for each turn, calculating the ground speed vector of the aircraft at a plurality of data points around the turn; and
    (d) determining the wind vector that best fits the ground speed vector data.

5. A method according to claim 4, wherein step (d) includes the steps of associating a variance with each data point and searching for the wind vector that minimizes the weighted variance of the true airspeed of these aircraft.

6. A method according to claim 4, further comprising the step of (e) incorporating the wind vector so determined into a wind data field for a wind velocity determination.

7. A method according to claim 6, wherein step (e) further includes associating a variance with the wind vector so determined and weighting the wind vector so determined in inverse relationship to the variance when such vector is incorporated into the wind data field.

8. A system, for determining wind velocity in a region in which a turn is being executed by an aircraft, the system comprising:
    (a) input means for receiving positional data, from a positional detection system pertaining to the aircraft during execution of the turn;
    (b) ground speed means, in communication with the input means, for calculating the ground speed vector of the aircraft at a plurality of data points around the turn; and
    (c) wind vector means, in communication with the ground speed means, for determining the wind vector that best fits the ground speed vector data.

9. A system according to claim 8, wherein the wind vector means includes (i) means for fitting a circle to the ground speed vectors taken during the turn and (ii) means for determining the velocity vector to the center of the circle.

10. A system according to claim 8, wherein the wind vector means includes means for (i) associating a variance with each data point and (ii) searching for the wind vector that minimizes system weighted variance of the true airspeed of the aircraft.

11. A system, for determining wind velocity in a region in which a plurality of turns are being executed by aircraft, the system comprising:
    (a) input means for receiving positional data, from a positional detection system, pertaining to an aircraft that may be making turns;
    (b) turn identification means, in communication with the input means, for identifying data pertaining to a turn of sufficient magnitude for calculation purposes;

(c) ground speed means, in communication with the input means, for determining, for each such turn, the ground speed vector of the aircraft at a plurality of data points around the turn; and (d) wind vector means, in communication with the ground speed means, for determining the wind vector that best fits the ground speed vector data.

12. A system according to claim 11 wherein the wind vector means includes means for (i) associating a variance with each data point and (ii) searching for the wind vector that minimizes system weighted variance of the true airspeed of the aircraft.

13. A system according to claim 12, further comprising (e) wind speed means, in communication with the wind vector means, for incorporating the wind vector determinations made by the wind vector means.

14. A system according to claim 13, wherein the wind speed means further includes means for associating a variance with the wind speed vector so determined and weighting the wind speed vector so determined in inverse relationship to the variance when such vector is incorporated into a wind data field.

* * * * *